Patented May 12, 1931

1,804,964

UNITED STATES PATENT OFFICE

FREDERICK M. TSCHIRNER, OF MEDFORD, NEW JERSEY, ASSIGNOR TO ZEOLITE CHEMICAL COMPANY, OF NEW YORK, N. Y., A CORPORATION OF NEW JERSEY

BASE EXCHANGE ZEOLITE AND PROCESS OF PREPARING SAME

No Drawing. Application filed February 4, 1928. Serial No. 252,032.

This invention relates generally to the art of softening hard water by the action of that class of minerals collectively identified as zeolites or base exchange silicates and more particularly relates to a method of preparing natural zeolites to improve their water softening qualities, and to the improved product derived by the process.

The invention has been developed in connection with the treatment of that particular species of zeolite called glauconite, more commonly known as greensand, so will be discussed particularly in this connection though without intention to limit the scope of the invention thereby, it being clearly understood that the method may be employed to advantage for the treatment of other species of base exchange water softening substances.

While glauconite is referred to by authorities on mineralogy as being essentially a silicate of iron and potassium no deposit has as yet been discovered that does not contain aluminum oxide. Reliable analyses give the alumina content as being from 5.72 to 7.96% of the whole. The fact that alumina is an ever present constituent of the mineral is of importance and cannot be ignored in devising methods for rendering the natural deposit suitable for commercial utilization as a base exchange silicate.

The best deposits of greensand for water softening purposes found in the United States at the present time are those of New Jersey but even these are not entirely uniform throughout. The physical characteristics of different layers vary in each bed. Tests made upon carefully separated specific portions show that the glauconite grains are of varying hardness as well as of varying color. The color may vary from white, through light green to almost black.

The hardness of the grains, that is their resistance to abrasive action, is of importance in the utilization of glauconite for softening water. If the grains are not hard the water passing through a bed of the same will be discolored which, for practical purposes, is objectionable and further the amount of the base exchange material in the bed will be reduced which is expensive. Unfortunately most of the glauconite in its natural state is colloidal in character and the colloidal suspension of the finely divided glauconite produces this objectionable discoloration of the water and coincident loss of softening material.

Various methods have heretofore been proposed for treating the natural glauconite, which as noted above is commercially unsuited for purification purposes, to render it more suitable for the requirements. The methods most generally employed have at one stage or another included a treatment with an alkali metal silicate. This treatment, while increasing the hardness of the particles by a direct silification resulting in the formation of new insoluble silicates yet have not relieved the discoloring effect, due apparently to the formation of a soluble iron silicate which imparts a brown color to the water. The formation of these soluble iron silicates can be reduced by using especially selected glauconite, by proper choice of steps, and the exercise of great care in the silification process but all of these precautionary measures add to the expense of treatment and are uncertain in results produced.

The objects of the present invention are:— in general to improve the base exchange qualities of natural base exchange minerals; to provide a process which will be applicable to "run of the mine" minerals as well as those of purer state with assurance of desired results; to produce a water softening agent which will not cause discoloration of the water nor any considerable diminution of the agent; and to provide a process which may be economically practiced on a commercial scale.

Further objects will be apparent from a consideration of the following description of one specific example of the method.

A run of mine glauconite is washed and screened to remove inert material and coarse particles, the very fine particles being removed by flotation. The washed and screened material is then treated with a dilute solution of phosphoric acid preferably at the boiling point of water. This can be done by placing, for example, 1500 pounds of glauconite into a blunger containing 240 gallons of water. To this I add 7½ pounds of an 85% phosphoric acid. The mixture is brought to a boiling point by the injection of live steam and heated for half an hour under continual agitation. The supernatant liquid is then poured off and the mineral is again boiled with a quantity (say, 5 lbs.) of dilute phosphoric acid. It will be found that on each successive treatment with phosphoric acid, the supernatant water becomes clearer. Usually three treatments are sufficient to make the glauconite suitable for commercial use as a water softening medium. The entire quantity of phosphoric acid can be applied in one operation. However, the action of the separate treatments has been found preferable.

A complete consumption of the phosphoric acid should not be permitted at any time during the operation and when lime compounds, notably calcium carbonate, are present in the mineral an increased amount of phosphoric acid may be necessary to insure the completion of the chemical process. The mineral is now washed with water in order to remove all unused phosphoric acid, then boiled for fifteen minutes with a dilute solution containing 2% by weight of the glauconite to be treated, of sodium aluminate— $Na_2Al_2O_4$, for the purpose of satisfying free phosphoric acid valences through combination with the sodium aluminate radical.

The combined treatment results in the formation of an enlarged mineral complex of greater exchange capacity through the union of phosphoric acid with the iron and alumina contained in the glauconite, followed by the neutralization of free phosphoric acid valences by the—Al-O-Na radical.

In place of the ordinary phosphoric acid of commerce, meta-phosphoric acid, or pyrophosphoric acid may also be used with substantially the same results.

An examination of the mineral treated in the above manner shows that a material change has taken place, noticeable in the enhanced exchange base value of the product. For instance, a glauconite or greensand that in its natural state possesses an absorptive capacity of 35 grains of hardness per pound dry weight after treatment is capable of absorbing 70 grains per pound, a doubling of the exchange base value having taken place.

In commercial practice it has been found economical to limit the number of treatments to less than that required for maximum effect but the product of commercial practice nevertheless has distinctly improved water-softening properties.

Regeneration of the agent made by the present process may be accomplished by the usual methods, such as by treatment with salt solutions without deterioration of the agent.

What I claim is:

1. The process of treating greensand which comprises screening and washing the natural mineral, subjecting it to a bath containing phosphoric acid with agitation at approximately the temperature of boiling water for about half an hour, drawing off the supernatant liquid, repeating the process several times, washing the mineral retained and boiling it for about fifteen minutes in a bath containing sodium aluminate.

2. The process of treating greensand which comprises removing inert material and the coarser and finer particles, subjecting the natural mineral to a bath containing a compound of phosphorus capable of yielding bi- or tri-valent acids with agitation at approximately the temperature of boiling water for about half an hour, drawing off the supernatant liquid, repeating the process several times, washing the mineral retained and boiling for about fifteen minutes in a bath containing sodium aluminate.

3. The process of treating greensand which comprises subjecting the natural mineral to a bath containing a compound of phosphorus capable of yielding bi- or tri-valent acids at approximately the temperature of boiling water, drawing off the supernatant liquid, and subjecting the retained mineral to a bath containing sodium aluminate at approximately the boiling point of water.

4. The process of treating greensand which comprises subjecting the natural mineral to a bath containing a compound of phosphorus capable of yielding bi- or tri-valent acids at approximately the temperature of boiling water, drawing off the supernatant liquid, and subjecting the retained mineral to a bath containing an alkali metal aluminate at approximately the boiling point of water.

5. The process of treating a water softening zeolite which comprises subjecting the natural mineral to a bath containing a compound of phosphorus capable of yielding bi- or tri-valent acids at approximately the temperature of boiling water, drawing off the supernatant liquid, and subjecting the retained mineral to a bath containing an alkali metal aluminate at approximately the boiling point of water.

6. The process of treating greensand which comprises subjecting it successively to a bath of a compound of phosphorus capable of yielding bi- or tri-valent acids and a bath of an alkali metal aluminate.

7. The process of treating a water softening zeolite which comprises subjecting it successively to a bath of a compound of phosphorus capable of yielding bi- or tri-valent acids and a bath of an alkali metal aluminate.

8. The process of treating greensand which comprises subjecting it to a bath containing a compound of phosphorus capable of yielding bi- or tri-valent acids and decanting and washing.

9. The process of treating a water softening zeolite which comprises subjecting it to a bath containing a compound of phosphorus capable of yielding bi- or tri-valent acids and decanting and washing.

10. The process of treating greensand which comprises subjecting it to a bath containing a compound of phosphorus capable of yielding bi- or tri-valent acids at a temperature not exceeding the boiling point of water.

11. The process of treating greensand which comprises subjecting it to a bath containing a compound of phosphorus capable of yielding bi- or tri-valent acids at approximately the temperature of boiling water.

12. The process of treating a natural water softening zeolite to improve its water softening qualities which comprises subjecting it to the action of an oxygen compound of phosphorus capable of yielding bi- or tri-valent acids.

13. The process of treating a natural water softening zeolite to improve its water softening qualities which comprises subjecting it to the action of a dilute solution of an oxygen compound of phosphorus capable of yielding bi- or tri-valent acids.

14. The process of treating a natural water softening zeolite to improve its water softening qualities which comprises subjecting it to the action of a warm dilute solution of an oxygen compound of phosphorus capable of yielding bi- or tri-valent acids.

15. The process of treating a natural water softening zeolite to improve its water softening qualities which comprises subjecting it to the action of phosphoric acid.

16. The process of treating greensand which comprises subjecting it to the action of a compound of phosphorus capable of yielding bi- or tri-valent acids.

17. The process of treating glauconite which comprises subjecting it to the action of a warm bath of dilute phosphoric compound capable of yielding bi- or tri-valent acids and subsequently to a warm bath of dilute sodium aluminate.

18. A base exchange water softening material comprising a natural greensand which has been subjected to the successive action of a compound of phosphorus capable of yielding bi- or tri-valent acids and an alkali metal aluminate.

19. A base exchange water softening material comprising a natural glauconite mineral which has been subjected to the action of a compound of phosphorus capable of yielding bi- or tri-valent acids.

20. A natural base exchange water softening silicate improved by the addition of insoluble compound of phosphorus.

21. A base exchange water softening compound containing insoluble hydrous alumina phosphates possessing base exchange properties.

22. The method of treating a natural zeolite to improve its water softening properties which includes the step of treating it with an acid of phosphorus capable of forming a compound of greater stability than the original zeolite.

23. The method of treating a natural zeolite to improve its water softening properties which includes the step of treating it with an acid of phosphorus capable of forming a compound of greater stability than the original zeolite and subsequently treating it with an alkali salt of a metallic acid.

In testimony whereof, I have signed my name to this specification this 1st day of February, 1928.

FREDERICK M. TSCHIRNER.